United States Patent

Nicolai

[11] Patent Number: 6,155,660
[45] Date of Patent: Dec. 5, 2000

[54] SWITCHGEAR CABINET WITH A FRAMEWORK

[75] Inventor: Walter Nicolai, Buseck, Germany

[73] Assignee: Rittal-Werk Rudolf Loh GmbH & Co. KG

[21] Appl. No.: 08/922,079

[22] PCT Filed: Mar. 1, 1996

[86] PCT No.: PCT/EP96/00875

§ 371 Date: Sep. 2, 1997

§ 102(e) Date: Sep. 2, 1997

[87] PCT Pub. No.: WO96/28004

PCT Pub. Date: Sep. 12, 1996

[30] Foreign Application Priority Data

Mar. 7, 1995 [DE] Germany .......................... 195 07 738

[51] Int. Cl.[7] .................................................. A47B 81/00
[52] U.S. Cl. .................................. 312/223.1; 312/265.1; 248/635
[58] Field of Search .............................. 312/223.1, 265.1, 312/265.2, 265.3, 400; 248/635, 634, 638; 52/167.7; 361/724

[56] References Cited

U.S. PATENT DOCUMENTS

| | | | |
|---|---|---|---|
| 1,845,551 | 2/1932 | Mitzl ................................... | 248/638 X |
| 2,144,848 | 1/1939 | Miller .................................. | 248/635 |
| 2,147,660 | 2/1939 | Loewus ............................... | 248/635 X |
| 2,208,532 | 7/1940 | Woodward ......................... | 248/635 X |
| 2,685,178 | 8/1954 | Eck ...................................... | 248/635 X |
| 3,563,627 | 2/1971 | Whipps .............................. | 312/265.2 |
| 4,342,913 | 8/1982 | Shepherd ........................... | 250/364 |
| 4,402,483 | 9/1983 | Kurabayashi et al. ............. | 248/638 X |
| 4,676,473 | 6/1987 | Giles .................................... | 248/638 |
| 4,713,714 | 12/1987 | Gatti et al. ......................... | 248/638 X |
| 4,997,240 | 3/1991 | Schmalzl et al. ................. | 312/265.2 X |
| 5,282,264 | 1/1994 | Reeves et al. ..................... | 392/382 |
| 5,326,162 | 7/1994 | Bovermann ....................... | 312/265.3 |
| 5,456,438 | 10/1995 | Long ................................... | 248/638 X |
| 5,460,348 | 10/1995 | Cox .................................... | 248/638 |

FOREIGN PATENT DOCUMENTS

| | | | |
|---|---|---|---|
| 103226 | 5/1937 | Australia ............................. | 248/635 |
| 471794 | 2/1951 | Canada ............................... | 248/635 |
| 1372458 | 4/1963 | France . | |
| 1512103 | 12/1967 | France ................................ | 248/635 |
| 2333407 | 6/1977 | France ................................ | 361/724 |
| 2610471 | 8/1988 | France ................................ | 361/724 |
| 1665621 | 4/1971 | Germany . | |
| 40 13 371 C1 | 7/1991 | Germany . | |
| 605186 | 5/1960 | Italy ................................... | 312/265.3 |
| 0155129 | 7/1987 | Japan ................................. | 248/638 |
| 0214533 | 9/1988 | Japan ................................. | 248/638 |
| 403229035 | 10/1991 | Japan ................................. | 248/638 |
| 1070523 | 1/1984 | U.S.S.R. ............................. | 248/638 |
| 23953 | 11/1902 | United Kingdom ............... | 52/167.7 |
| 664070 | 1/1952 | United Kingdom . | |
| 812854 | 5/1959 | United Kingdom . | |
| 942434 | 11/1963 | United Kingdom . | |
| 2249714 | 5/1992 | United Kingdom ............... | 312/265.3 |

*Primary Examiner*—Peter M. Cuomo
*Assistant Examiner*—David E. Allred
*Attorney, Agent, or Firm*—Jansson, Shupe, Bridge & Munger, Ltd.

[57] ABSTRACT

The switchgear cabinet has a framework that is closed or may be closed by wall elements and at least one door. An earthquake-proof mounting of apparatus, mounting plates or the like is achieved in that at least one housing or frame is mounted into the framework. The bottom area of the housing or frame is elastically secured by vertical dampers on horizontal bearing rails arranged between lateral vertical members. The top area of the housing or frame is elastically joined to the vertical members of the framework either directly by means of horizontal dampers or indirectly by means of angle brackets.

14 Claims, 4 Drawing Sheets

SWITCHGEAR CABINET WITH A FRAMEWORK

FIELD OF THE INVENTION

This invention is related generally to storage cabinets and, more particularly, to storage cabinets for electronic components.

BACKGROUND OF THE INVENTION

In switch cabinets like the ones used for electronic components, the mounting plates, module supports or the like are rigidly built into the rack. During earthquakes, these rigid connections lead to damage and destruction as a result of the shearing and pulling forces that arises in varying directions and that can lead to total operating failure.

It is desirable to store components, especially sensitive electronic components in a cabinet that could protect them from the shock and vibration that results from events such as earthquakes.

OBJECTS OF THE INVENTION

It is an object of this invention to provide overcoming some of the problems and shortcomings of devices of the prior art.

Another object of this invention is to provide a switch cabinet that provides earthquake proof protection for components stored within. How these and other important objects are accomplished will be apparent from the following descriptions and the drawings.

SUMMARY OF THE INVENTION

This task is accomplished, according to the invention, by having at least one insertable housing or insertable rack, that is, fastened in a cushioned manner on horizontal carrier rails which are inserted between the lateral vertical rack members, and by having the upper area of the insertable housing or insertable rack connected to the vertical rack members of the rack by means of horizontally directed cushioning buffers, either directly or by means of angle fasteners.

The invention concerns an apparatus for containing sensitive components such as electronic equipment comprised of: (1) a switch cabinet having a plurality of walls and at least one cabinet door; (2) a support rack having a plurality of lateral vertical rack members enclosed within the switch cabinet; (3) at least one housing having upper and lower portions, inserted in the support rack and connected in the upper area to the vertical rack members; (4) a plurality of horizontal carrier rails inserted between the lateral vertical rack members and fastened to the lower portion of the housing; and (5) at least one cushioning device having a first and second end, affixed between the housing and the horizontal carrier rails.

The shearing and pulling forces acting on the switch cabinet are kept away from the insertable housing or insertable rack means of this cushioned type of insertion, since the vertical and horizontally directed cushioning buffers permit a limited deflection and thus movement of the insertable housing or insertable rack on all sides with respect to the rack, and thus with respect to the actual switch cabinet. The inserted components lodged in the insertable housing or insertable rack are therefore protected with regard to forces arising from an earthquake.

In a specific embodiment of the invention, the housing has an underside with four corners. A cushioning device is arranged in each of the four corners and the cushioning devices connect the underside of the housing to the horizontal carrier rails. In a particular aspect of this embodiment, the housing has a first and second side. The first and second sides each have upper and lower areas, and vertical cushioning devices positioned perpendicular to the first and second sides connect the vertical rack members to the upper areas of the first and second sides. In a specific aspect of the embodiment, the cushioning device has a cylindrical shape with a first and second end and threaded bushings are inserted into each end.

In yet another aspect of the embodiment, the housing has a first side that has an opening in its center. A second side is positioned opposite the first side and a third and fourth side are located perpendicular to the first and second sides and opposite of each other. In such embodiment, a first and second end portion, opposite of each other, are attached to the first, second, third, and fourth sides of the housing.

In yet another aspect of the embodiment, the support rack has a plurality of fastening receptacles and the housing has a plurality of fastening receptacles. In one aspect of this version, the housing includes a plurality of fastening receptacles and at least the front side of the housing is chamfered.

In another aspect of the invention, the switch cabinet has a base and a plate shaped cushioning rack connects the support rack to the base of the switch cabinet.

In the preferred embodiment of the invention, the apparatus is comprised of: (1) a switch cabinet having a plurality of walls and at least one cabinet door; (2) a support rack having a plurality of lateral vertical rack members enclosed within the switch cabinet; (3) at least one housing having upper and lower portions, inserted in the support rack; (4) a fastening angle connected to one of the vertical rack members; (5) at least one cushioning device affixed between the fastening angle and the upper area of the housing; (6) a plurality of horizontal carrier rails inserted between the lateral vertical rack members and fastened to the lower area of the housing; and (7) at least one cushioning device having a first and second end, affixed between the housing and the horizontal carrier rails.

In a particular aspect of such embodiment, the housing has a first and second side. The first and second sides have upper and lower areas and vertical cushioning devices positioned perpendicular to the first and second sides connect the vertical rack members to the upper areas of the first and second sides. In a still more particular aspect of the embodiment, the cushioning device has a cylindrical shape with a first and second end and threaded bushings are inserted into each end.

In another aspect of the preferred embodiment, the housing has a first side having an opening in its center. A second side is positioned opposite the first side, and a third and fourth side perpendicular to the first and second sides and opposite of each other. In such version, the first and second end portions located opposite of each other, are attach to the first, second, third, and fourth sides of the housing.

In yet another version of the embodiment, the support rack has a plurality of fastening receptacles and the housing has a plurality of fastening receptacles. In one aspect of such version, the housing includes a plurality of fastening receptacles and at least the front side of the housing is chamfered.

In still another version of the preferred embodiment, the switch cabinet has a base and a plate shaped cushioning rack connects the support rack to the base of the switch cabinet.

DETAILED DESCRIPTIONS OF THE PREFERRED EMBODIMENTS

Figure 1:
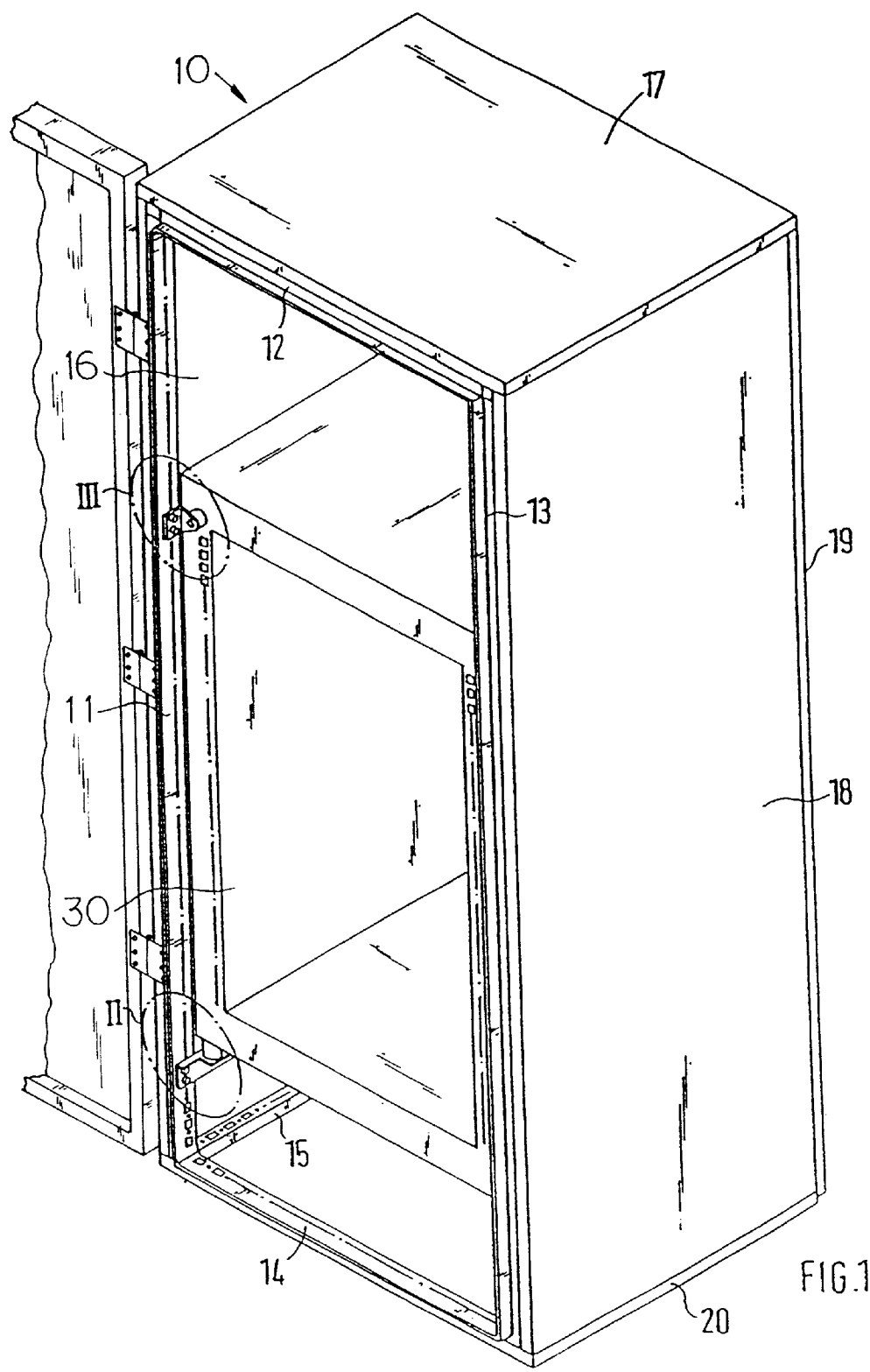
FIG. 1 is a perspective view of a switch cabinet showing a rack with the door removed and an insertable housing placed in the rack.
Figure 4:
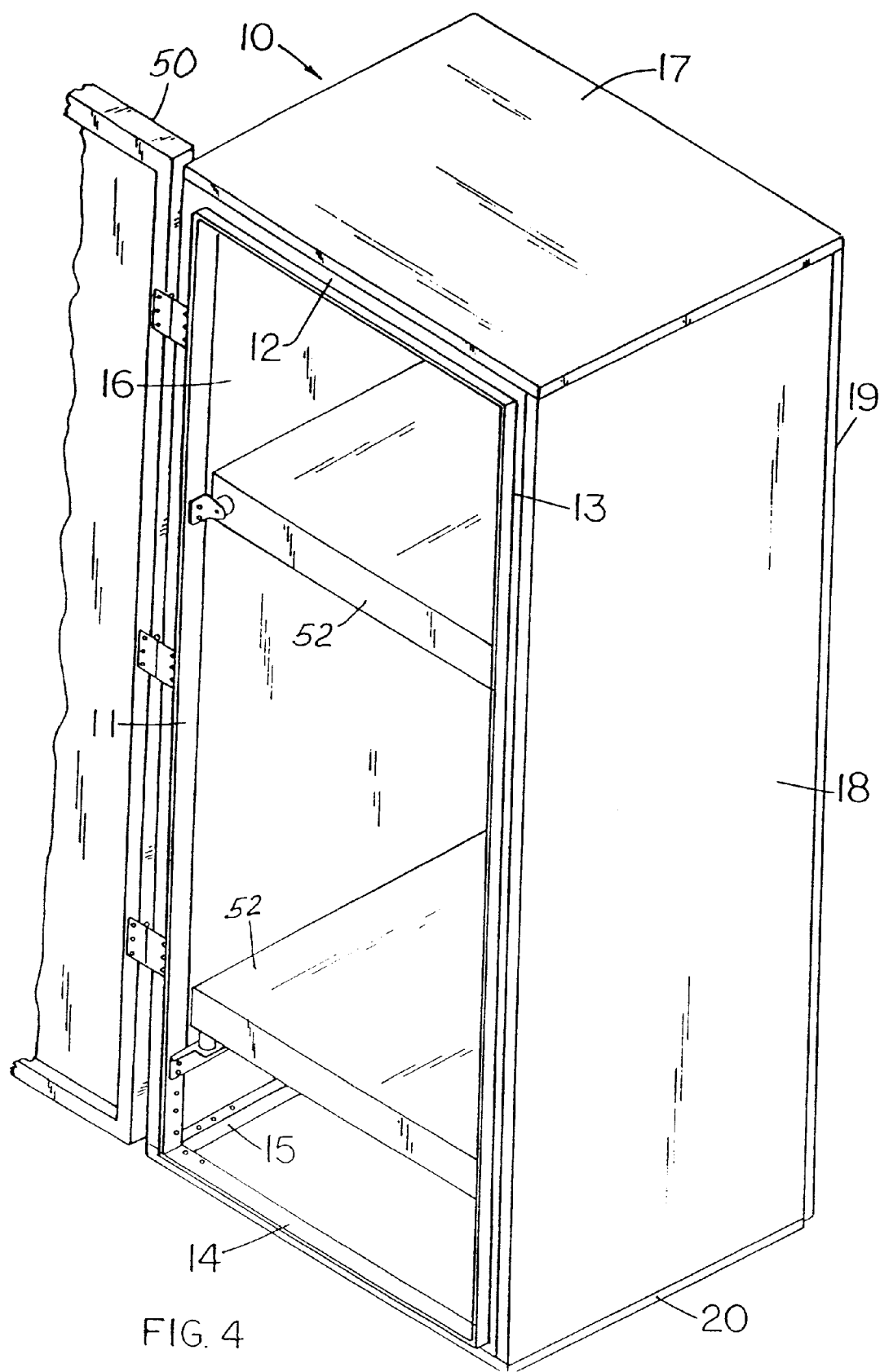
FIG. 4 is a perspective view of a switch cabinet showing a rack with the door attached and insertable racks located within the cabinet.

In FIG. 1 only the vertical rack members 11 and 13, the horizontal members 12 and 14 and the lower members 15 of the rack 10 of the switch cabinet can be seen. The rack members can be rigidly connected to each other, e.g., by welding. But they can also be connected to each other by means of corner connectors. Wall elements 16, 17, 18 and 19 close the rack 10, except for the front and bottom side. As shown in FIG. 4, The front side is closed by means of a cabinet door 50. A part of the rack members can also be chamfered at the wall elements 16 to 19. A series of fastening receptacles 33 and/or fastening bore holes 27 are thereby inserted in the rack members.

Figure 2:
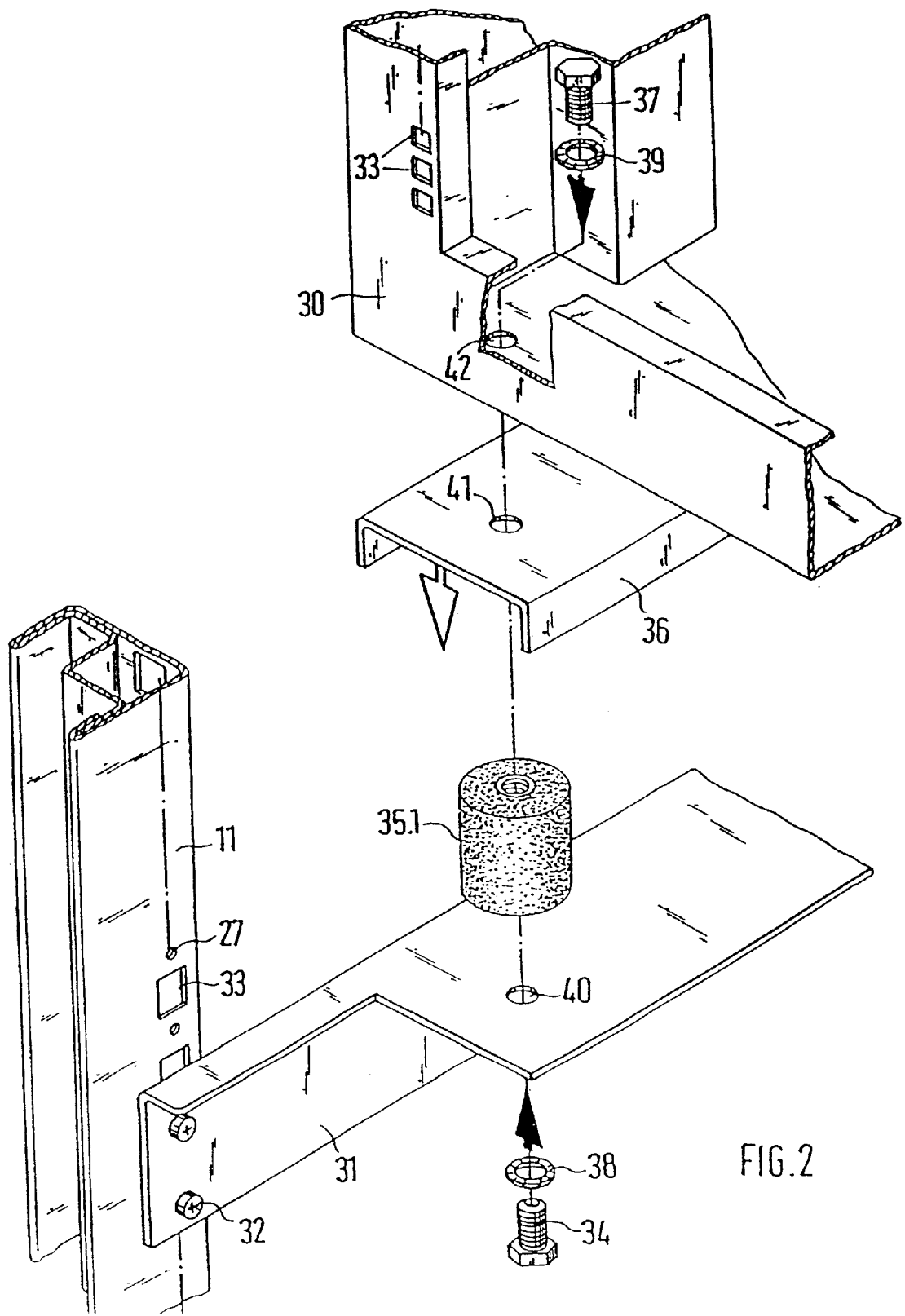
FIG. 2 is an exploded view of the parts for the vertical cushioned fastening of the lower area in the insertable housing.

The lower fastening point 11 is shown in FIG. 2 in exploded view. Carrier rails 31 are inserted at both sides between the front and the rear vertical rack members, such as, for example, 11. The carrier rails 31 are fastened with fastening screws 32 to the rack members. Cushioning buffers 35.1 are fastened vertically directed on the horizontal members of the carrier rails 31 by means of fastening screws 34 and washers 38, whereby threaded bushings are provided on the front side of the cylindrical cushioning buffer 35.1. Thus, fastening opportunities are provided on the front side on the cushioning buffers 35.1, without impairing the cushioning function on any side. The bore holes 40 for the fastening screws 34 in the carrier rails 31 are inserted such that the insertable housing 30 is supported cushioned on the underside on all four corners. The insertable housing 30 is fastened by means of fastening screws 37 and washers 39 on the upper side of the cushioning buffer 35.1, whereby the fastening screws 37 are guided through bore holes 42 of the insertable housing 30 and bore holes 41 of the intermediate rails 36. The insertable housing 30 can bear series of fastening receptacles 33 and/or fastening bore holes in the area of the open front side, as well as in the rack members of the rack 10.

Figure 3:
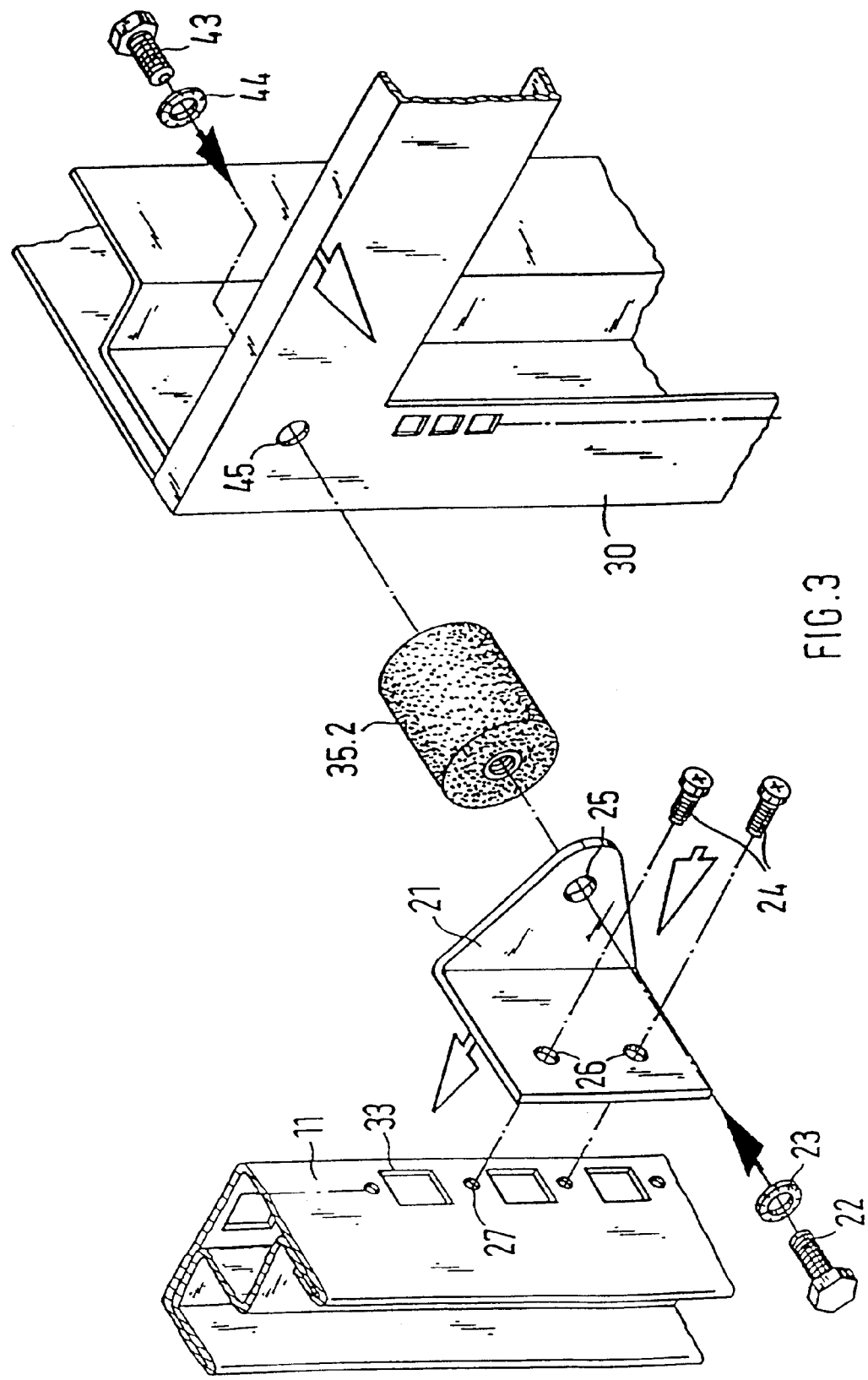
FIG. 3 is an exploded view of the parts used to cushion and fasten the upper area of the insertable housing in the rack of the switch cabinet.

As FIG. 3 illustrates, the upper area of the insertable housing 30 or the insertable rack 52 is fastened in a cushioned manner by means of a horizontally directed cushioning buffer 35.2. Fastening angles 21 are fastened on the front vertical rack members, e.g., 11, whereby fastening screws 24 are screwed through bore holes 26 of the fastening angle 21 in the fastening bore holes 27 of the rack member 11. The cushioning buffer 35.2 is fastened on the other member of the fastening angle 21 by means of the fastening screw 22 and a washer 23, while the fastening screw 43 is connected to the other side of the cushioning buffer 35.2 through the washer 44 and the bore hole 45 of the insertable housing 30.

The front side of the insertable housing 30 is fastened to the front vertical rack member and the rear side of the insertable housing 30 on the rear vertical rack member of the rack 10 in a cushioned manner with the aid of two respective cushioning buffers 35.2. If the insertable housing 30 projects between the lateral vertical rack members, then the fastening can take place directly on the rack member by means of the cushioning buffer 35.2. By appropriate dimensioning, the sides of the insert housing 30 can also be fastened horizontally cushioned on the rack members, whereby the cushioning buffers 35.2 are aligned parallel to the open front side of the switch cabinet.

As a result of the four-fold lower and upper cushioned support of the insertable housing 30 on the rack 10 an earthquake proof insertion is achieved, which can be improved even further if the rack 10 is connected to the rack like base of the switch cabinet by means of a plate shaped cushioning rack, so that the base is rigidly connected to the support surface such that forces can be intercepted in this transition area and kept away from the rack 10.

While the principles of this invention have been described in connection with specific embodiments, it should be understood clearly that these descriptions are made only by way of example and are not intended to limit the scope of the invention.

What is claimed:

1. An apparatus for containing sensitive components such as electronic equipment comprised of:

a switch cabinet having a plurality of walls and at least one cabinet door;

a support rack having a plurality of lateral vertical rack members enclosed within the switch cabinet;

at least one housing having an upper and a lower portion and a first and second side that each include upper and lower areas, the housing inserted in the support rack such that vertical cushioning devices perpendicular to the first and second sides connect the vertical rack members to the upper areas of the first and second sides;

horizontal carrier rails attached to and between the lateral vertical rack members, the lower portion of the housing being fastened to the horizontal carrier rails; and at least one cushioning device having first and second ends abutting the housing and the horizontal carrier rails respectively.

2. The apparatus of claim 1 wherein:

the housing has an underside with four corners;

a cushioning device is arranged in each of the four corners; and the cushioning devices connect the underside of the housing to the horizontal carrier rails.

3. The apparatus of claim 1 wherein:

the cushioning device has a cylindrical shape with a first and second end; and threaded bushings are inserted into each end.

4. The apparatus of claim 1 wherein:

the support rack has a plurality of fastening receptacles; and the housing has a plurality of fastening receptacles.

5. The apparatus of claim 1 wherein:

the housing has a first side having an opening in the center;

a second side opposite the first side;

a third and fourth side opposite each other and perpendicular to the first and second sides; and a first and a second end portion, opposite of each other, attached to the first, second, third, and fourth sides of the housing.

6. The apparatus of claim 5 wherein:

the housing includes a plurality of fastening receptacles; and at least the front side of the housing is chamfered.

7. The apparatus of claim 1 wherein:

the switch cabinet has a base; and a plate shaped cushioning rack connects the support rack to the base of the switch cabinet.

8. An apparatus for containing sensitive components such as electronic equipment comprised of:

a switch cabinet having a plurality of walls and at least one cabinet door;

a support rack having a plurality of lateral vertical rack members enclosed within the switch cabinet;

at least one housing having upper and lower portions, inserted in the support rack;

a fastening angle connected to one of the vertical rack members;

at least one cushioning device affixed to the fastening angle and the upper portion of the housing;

horizontal carrier rails inserted between the lateral vertical rack members and fastened to the lower portion of the housing; and at least one cushioning device having first and second ends affixed to the housing and the horizontal carrier rails respectively.

9. The apparatus of claim 8 wherein:

the housing has a first and second side;

the first and second sides have upper and lower areas; and vertical cushioning devices perpendicular to the first and second sides connect the vertical rack members to the upper areas of the first and second sides.

10. The apparatus of claim 8 wherein:

the cushioning device has a cylindrical shape with a first and second end; and threaded bushings are inserted into each end.

11. The apparatus of claim 8 wherein:

the housing has a first side having an opening in the center;

a second side opposite the first side;

a third and fourth side opposite each other and perpendicular to the first and second sides; and a first and second end portion, opposite of each other, attached to the first, second, third, and fourth sides of the housing.

12. The apparatus of claim 8 wherein:

the support rack has a plurality of fastening receptacles; and the housing has a plurality of fastening receptacles.

13. The apparatus of claim 12 wherein:

the housing includes a plurality of fastening receptacles; and at least the front side of the housing is chamfered.

14. The apparatus of claim 8 wherein:

the switch cabinet has a base; and a plate shaped cushioning rack connects the support rack to the base of the switch cabinet.

* * * * *